United States Patent Office 3,705,207
Patented Dec. 5, 1972

3,705,207
MOLTEN ADHESIVES CONTAINING POLYAMIDE AND POLYVINYL ALCOHOL
Stanley Albert Sills, Pontypool, England, assignor to Imperial Chemical Industries Limited, London, England
No Drawing. Filed Jan. 2, 1970, Ser. No. 455
Claims priority, application Great Britain, Jan. 7, 1969, 1,034/69; May 5, 1969, 22,710/69
Int. Cl. C08g 41/04
U.S. Cl. 260—857
3 Claims

ABSTRACT OF THE DISCLOSURE

Polyamides with adhesive properties by the incorporation therein of polyhydric alcohols, e.g. polyvinyl alcohol, mannitol, sorbitol. Improves bonding to unmodified polyamides, polyesters, aluminium, titanium, stainless steel and glass.

---

The present invention relates to adhesion and more particularly to synthetic polyamides possessing adhesive properties.

If a material, which is normally non-adhesive in behaviour can be caused to stick to or bond to other materials, then the commercial and industrial value of that material must be enhanced. Admittedly, some materials are particularly valuable to industry for just the opposite reason, namely, that they are inert and are unable to stick to or bond to other materials. Nevertheless, even those materials must be more useful if an adhesive bond can intentionally be created. For example, though polytetrafluoroethylene is valuable for its non-stick properties, its exploitation in domestic cooking ware would be impracticable if it were not possible in the first instance to bond the polymer to the material of a cooking utensil.

Traditionally, bonding one material to another has usually meant coating one or possibly both of the surfaces to be joined with an adhesive or "glue" and then holding these surfaces in contact in order that the adhesive or "glue" might take or set. Unfortunately, this technique may suffer from at least three major draw-backs. One, the final joined article includes a component whose function is solely that of holding other components together, two, the final strength of the join can be no greater than the inherent strength or cohesiveness of the "glue" itself, and three, the final joint is in fact two joints of surface to "glue" and thus is liable to double the weaknesses of a single joint.

Similar considerations are equally applicable to the bonding of synthetic polyamidies to various other polymers and materials.

Thus, the provision of a synthetic polyamide, normally non-adhesive in behaviour, which is capable of sticking to or bonding to other materials, would obviously be of commercial and industrial importance.

Surprisingly, it has been found that such an "adhesive" polyamide can be created if small quantities of polyhydric alcohols are added to the normally non-adhesive polymer.

Accordingly, the present invention provides a polyamide composition having incorporated therein one or more polyhydric alcohols.

Preferably, the polyhydric alcohol is a straight chain polyhydric alcohol, for example, polyvinyl alcohol, mannitol, sorbitol.

When fibre-forming polyamides are to be modified, the amount of polyhydric alcohol added in the practise of the invention is usually of the order of 0.01% to 5% by weight. Preferably, the amount of polyhydric alcohol added is not greater than 1% by weight.

On the other hand, when polyamides suitable for moulding are to be similarly modified, up to 30% by weight of polyhydric alcohol may be employed. Preferably, the amount of polyhydric alcohol added is not greater than 20% by weight.

The effect of adding small quantities of a polyhydric alcohol or alcohols to normally non-adhesive polyamides is strikingly unexpected in view of the well-known sensitivity of such additives per se to moisture. If a polyhydric alcohol, for example, polyvinyl alcohol is used by itself as a "glue" and the resulting joint is contacted with moisture, then the joint soon fails, whereas, if a similar joint is effected using a molten polyamide composition of the present invention, then there is no such failure.

In broad terms the invention is applicable to the bonding of polyamides so modified to various unmodified polymers, metals and non-metals.

In particular the invention is applicable to the bonding of such modified compositions to unmodified polyamides, polyesters, aluminium, titanium, stainles steel and glass.

The polyhydric alcohol or alcohols may be added to the normally non-adhesive polyamide at any appropriate time during or after its preparation and addition at the salt stage has been found convenient.

Once the polyhydric alcohol containing polyamide has been prepared, it is just as ready for fabrication as is the unmodified polymer. Included by the expression "fabrication" is comminution of the modified polyamide which may be carried out prior to re-forming or for purposes of storage.

Though the invention is obviously valuable in that it may obviate the need to resort to conventional adhesives in many cases, polyamides modified according to the invention may nevertheless be used conventionally for joining various other materials together.

One valuable outlet for the present invention is the provision of "adhesive" polyamidie continuous filaments or staple fibres and their subsequent application in the textile industry. In particular there may be mentioned the fabrication of non-woven materials where bonding within the non-woven structure is often important.

Another useful outlet is in the manufacture of multi-component filaments and fibres and in particular bi-component filaments and fibres. Hitherto, difficulties have frequently been encountered in producing sufficient adhesion in, for example, side-by-side or sheath/core type polyamide/polyester bi-component filaments and fibres, in order to prevent separation of the components under conditions of stress. By the addition of small quantities of polyhydric alcohols to the polyamide component such separation can be minimized.

As a result of their adhesive properties, polyamides modified according to the present invention may conveniently be employed as reinforcing agents or fillers for various other materials (polymeric or non-polymeric) or may themselves be reinforced or filled by various other materials (polymeric or non-polymeric).

The term "polyamide" as used in this specification embraces both homo- and co-polyamides and in the practise of the present invention the modification of polyhexamethylene adipamide and polycaprolactam has been found to be particularly effective.

The following examples illustrate but do not limit the present invention.

EXAMPLE 1

A number of polyamides containing 0.2% to 0.5% by weight of polyvinyl alcohol were allowed to solidify in contact with various metal/non-metal test materials. The polyvinyl alcohol was added to the polyamide prior to polymerisation i.e. at the salt stage. The observed adhesion of the polyamides to these materials is tabulated below:

| Polymer | Polyvinyl alcohol percent by weight | Test material | Observed adhesion |
|---|---|---|---|
| Polyhexamethylene adipamide | Nil | Aluminium | Slight. |
| | 0.2 | do | Strong. |
| | 0.5 | do | Do. |
| | 0.5 | Glass | Good. |
| Polyhexamethylene suberamide | Nil | Aluminium | Slight. |
| | 0.2 | do | Strong. |
| | 0.5 | do | Do. |
| Polyhexamethylene sebacamide | Nil | Aluminium | Slight. |
| | 0.2 | do | Strong. |
| | 0.5 | do | Do. |
| Polycaprolactam | Nil | Aluminium | Slight. |
| | 0.2 | do | Strong. |
| | 0.5 | do | Do. |

In order to demonstrate the resistance of the bond to moisture, a number of control laminates were prepared using polyvinyl alcohol to bond webs of unmodified polyhexamethylene adipamide fibres to aluminium and glass. These were the subjected to boiling in water, when, due to the solubility of the polyvinyl alcohol the laminate was quickly destroyed. On repeating the experiment using laminates prepared according to the present invention, no break down of the laminate occurred after boiling for a similar length of time.

EXAMPLE 2

Two 6 inch x 1 inch strips of ⅛ inch thick Noral 28S (composition 94% aluminium, 5% copper, 0.5% bismuth and 0.5% lead) were overlapped by 1 inch in a brass mould. 0.15 gram of finely powdered polymer was spread evenly between the one square inch overlap and slight pressure applied by means of a spring clip. The complete mould was then heated under 1 atmosphere of steam for 45 minutes at 290° C. On removal from the heater the joint was quenched in water and removed from the mould. The strength of the joint was measured by pulling the two strips apart on an Instron tensile tester at a rate of 0.1 cm./min.

A joint made with unmodified polyhexamethylene adipamide had a breaking load of 1,034 p.s.i. whereas with polyhexamethylene adipamide containing 0.5% by weight of polyvinyl alcohol the joint strength increased to 1,775 p.s.i.

EXAMPLE 3

Using the method described in Example 2, joints were made using polyhexamethylene adipamide containing polyvinyl alcohols of different degrees of hydrolysis and molecular weight. Each polymer contained 0.5% by weight of the polyvinyl alcohol. The results are given in the following table.

| Polyvinyl alcohol-viscosity of 4% aqueous solution at 20° C., cp. | Degree of hydrolysis | Bond strength, p.s.i. |
|---|---|---|
| No polyvinyl alcohol | | 1,012 |
| 4 | 98.4 | 1,210 |
| 4 | 89.3 | 1,452 |
| 4 | 81.5 | 1,408 |
| 4 | 98.4 | 1,210 |
| 16 | 98.4 | 1,320 |
| 30 | 98.4 | 1,562 |
| 60 | 98.4 | 1,540 |

All the polyvinyl alcohol joints showed improved bond strength, the improvement decreasing with degree of hydrolysis and increasing with molecular weight.

EXAMPLE 4

Using the method described in Example 2, joints were made using polycaprolactam containing polyvinyl alcohols of different degrees of hydrolysis and molecular weight. The results are given in the following table:

| Polyvinyl alcohol-viscosity of 4% aqueous solution at 20° C., cp. | Degree of hydrolysis | Polyvinyl alcohol, percent by weight | Bond strength, p.s.i. |
|---|---|---|---|
| No polyvinyl alcohol | | 0 | 717 |
| 4 | 98.4 | 0.2 | 1,080 |
| 4 | 98.4 | 0.5 | 1,325 |
| 5 | 73.4 | 0.2 | 905 |

In each case there was a clear increase in bond strength.

EXAMPLE 5

Samples of Noral 28S alloy were etched with Barretts reagent for 5 seconds at room temperature (Barretts reagent comprises 9 parts concentrated hydrochloric acid, 3 parts concentrated nitric acid, 2 parts 20 vol./vol. hydrofluoric acid and 5 parts water). Joints were made in the manner described in Example 2. The joint made with the control polyamide had a strength of 1276 p.s.i. and that made with a polyamide containing 0.5% by weight of polyvinyl alcohol, a strength of 1584 p.s.i.

EXAMPLE 6

Noral 28S strips were anodised for 30 minutes using a D.C. current of 1.0 amp and 15% vol./wt. sulphuric acid. Joints were made from the anodised strips as described in Example 2. Control polyhexamethylene adipamide produced a bond with a strength of 704 p.s.i. whereas polyhexamethylene adipamide containing 0.5% by weight of polyvinyl alcohol produced a bond of 1100 p.s.i.

EXAMPLE 7

Lap joints were made from Noral 28S strips as described in Example 2 except that the polyamide used as the adhesive contained 0.3% by weight of sorbitol. Bond strength was 1386 p.s.i. as compared with the control of 1034 p.s.i.

EXAMPLE 8

Lap joints were made from titanium metal strips and polyamide as described in Example 2. Polyhexamethylene adipamide without polyvinyl alcohol gave a bond strength of 744 p.s.i. which increased to 1498 p.s.i. when the same polymer with 0.5% by weight of polyvinyl alcohol was used.

EXAMPLE 9

Using the method described in Example 2, joints were made using polyhexamethylene adipamide and stainless steel (EN58B). The same polyvinyl alcohols as were used in Example 4 were employed. The results are given in the table below:

| Polyvinyl alcohol-viscosity of 4% aqueous solution at 20° C., cp. | Degree of hydrolysis | Polyvinyl alcohol, percent by weight | Bond strength, p.s.i. |
|---|---|---|---|
| No polyvinyl alcohol | | 0 | 1,260 |
| 4 | 98.4 | 0.2 | 1,665 |
| 4 | 98.4 | 0.5 | 1,635 |
| 5 | 73.4 | 0.2 | 1,480 |

In each case the presence of a polyvinyl alcohol had a significant effect on bond strength.

EXAMPLE 10

Dumbell shaped mouldings were made from control polyhexamethylene adipamide and polyhexamethylene adipamide containing 0.5% by weight of polyvinyl alcohol. Lap joints were made from these mouldings using Araldite (Registered Trademark) epoxy resin as the adhesive. The epoxy resin was cured for 4 hours at 80° C. The joints were tested on an Instron tensile tester at 0.1 cm./min. The epoxy joint on the control polyamide failed at 147 p.s.i. while the modified polyamide/Araldite moulding remained intact up to a force of 675 p.s.i. when the polyamide moulding itself broke.

EXAMPLE 11

Polyhexamethylene adipamide containing 0.5% by weight of polyvinyl alcohol was melt spun as a 26 filament, 140 denier 50/50 side-by-side bi-component yarn with polyethylene terephthalate. The yarn was evaluated for adhesion between the two components by an abrasion test which consisted of rubbing the yarn with 00 grade emery paper 20,000 times. The experimental yarn was found to have five separated filaments while a control yarn spun from additive free polyhexamethylene adipamide and polyethylene terephthalate had more than 20 separated filaments.

EXAMPLE 12

Example 11 was repeated except that the polyamide contained 0.25% by weight of mannitol. The number of separated modified filaments observed on this occasion was 2.

EXAMPLE 13

Example 11 was repeated except that the polyamide contained 0.25% by weight of sorbitol. The number of separated modified filaments observed on this occasion was 1.

EXAMPLE 14

Polyhexamethylene adipamide, chopped strand glass and polyvinyl alcohol were blended in a screw extruder, the resulting intimate mixture being chipped, dried and moulded into test samples. The samples were tested for tensile strength, flexural modulus and Izod impact strength. The results are shown below:

| Polyvinyl alcohol, percent by weight | Tensile strength $\times 10^3$, p.s.i. | Flexural modulus $\times 10^5$, p.s.i. | Izod impact strength, ft. lbs./in. |
|---|---|---|---|
| 0 | 24.7 | 10.1 | 1.30 |
| 1 | 26.3 | 10.7 | 1.40 |
| 3 | 27.2 | 10.7 | 1.48 |
| 5 | 27.9 | 11.0 | 1.56 |

In all cases there was a measured increase in tensile strength, flexural modulus and Izod impact strength.

EXAMPLE 15

Polymers derived from hexamethylene adipamide containing separately Supreme Kaolin and alumina as fillers with and without polyvinyl alcohol were moulded and tested in the conventional manner. The results are given below:

| Polyhexamethylene adipamide, percent by weight | Tensile strength $\times 10^3$, p.s.i. | Flexural modulus $\times 10^5$, p.s.i. | Izod impact strength, ft. lbs./in. |
|---|---|---|---|
| Control | 13.3 | 3.45 | 0.86 |
| Containing 20% Supreme Kaolin | 13.9 | 5.68 | 0.74 |
| Containing 20% Supreme Kaolin, 1.0% polyvinyl alcohol | 13.8 | 5.68 | 0.80 |
| Containing 20% alumina | 14.3 | 4.91 | 0.62 |
| Containing 20% alumina, 1.0% polyvinyl alcohol | 14.5 | 4.93 | 0.74 |

The addition of polyvinyl alcohol to the filled polyamide increases the impact strength to a value more comparable with the control polymer and thus a cheaper, filled polyamide with normal properties is made available.

What I claim is:

1. A molten adhesive composition comprising a moldable or fibre-forming polyamide selected from the group consisting of polyhexamethylene adipamide, polyhexamethylene suberamide, polyhexamethylene sebacamide and polycaprolactam and from 0.01% to 30% by weight polyvinyl alcohol.

2. A composition as claimed in claim 1 in which the polyamide is polyhexamethylene adipamide.

3. A composition as claimed in claim 1 in which the polyamide is polycaprolactam.

References Cited

UNITED STATES PATENTS

| | | | |
|---|---|---|---|
| 2,703,756 | 3/1955 | Herrick | 260—857 |
| 2,895,786 | 7/1959 | Schlack | 260—857 |
| 2,931,272 | 4/1960 | Haas | 260—857 |
| 3,161,699 | 12/1964 | Matsubayashi | 260—898 |
| 3,272,640 | 9/1966 | Geurden | 260—857 |
| 2,615,002 | 10/1952 | Huruwitz | 260—78 S |
| 2,639,278 | 5/1953 | Stott | 260—78 S |
| 2,811,459 | 10/1957 | Wittcoff | 260—78 S |

FOREIGN PATENTS

| | | | |
|---|---|---|---|
| 1,150,810 | 6/1963 | Germany | 260—857 |
| 43/18,619 | 8/1968 | Japan | 260—857 |
| 6516106 | 6/1966 | Netherlands | 260—78 S |

PAUL LIEBERMAN, Primary Examiner

U.S. Cl. X.R.

161—172, 184, 190; 260—37 N, 78 S, 857 L